US005792312A

United States Patent [19]

Dotterman et al.

[11] Patent Number: 5,792,312

[45] Date of Patent: Aug. 11, 1998

[54] HOOK ASSEMBLY FOR USE ON MASKING DEVICE

[75] Inventors: Perry S. Dotterman, Maplewood; Laura L. Clark, Woodbury, both of Minn.

[73] Assignee: Minnesota Mining and Manufacturing Company, St. Paul, Minn.

[21] Appl. No.: 662,581

[22] Filed: Jun. 13, 1996

[51] Int. Cl.$^{6}$ .......... B32B 31/00

[52] U.S. Cl. .......... 156/579; 248/210; 248/302

[58] Field of Search .......... 156/579, 523, 156/577; 248/303, 304, 339, 210, 211, 302; D8/367, 370, 373

[56] References Cited

U.S. PATENT DOCUMENTS

| | | | |
|---|---|---|---|
| D. 24,287 | 5/1895 | Snedden | D8/370 |
| D. 300,804 | 4/1989 | Myers | D8/370 X |
| D. 354,430 | 1/1995 | Lawrence et al. | D8/370 X |
| 3,220,682 | 11/1965 | Hannon | 248/303 X |
| 3,332,653 | 7/1967 | Hoelzel | 248/210 |
| 3,335,991 | 8/1967 | Epple | 248/303 X |
| 3,787,271 | 1/1974 | Wahlquist | 156/554 |
| 4,077,595 | 3/1978 | Carter et al. | 248/210 |
| 4,379,019 | 4/1983 | Pool | 156/527 |
| 4,425,182 | 1/1984 | Jones et al. | 156/554 |
| 4,508,587 | 4/1985 | Hunter | 156/527 |
| 4,667,891 | 5/1987 | Pool | 242/75.4 |
| 4,783,016 | 11/1988 | Pool | 242/55.2 |
| 4,915,768 | 4/1990 | Soderberg | 156/527 |
| 4,990,214 | 2/1991 | Heil et al. | 156/527 |
| 5,636,409 | 6/1997 | Akins | 16/114 R |
| 5,683,542 | 11/1997 | Poole | 156/577 X |

*Primary Examiner*—James Engel
*Attorney, Agent, or Firm*—William L. Huebsch

[57] ABSTRACT

A hook assembly including a hook adapted to be releasably attached to a portable masking device that adheres tape to masking material to form a composite masking material having a portion of the coating of pressure sensitive adhesive exposed so that the exposed adhesive can adhere the composite masking sheet along a surface to be masked. The hook includes an attachment portion having adapted to lay along a handle for the masking device, and a generally C-shaped engagement portion extending from the attachment portion that defines a recess. The engagement portion can be positionable around a structure with the structure in the recess to hang the masking device on the structure.

3 Claims, 5 Drawing Sheets

HOOK ASSEMBLY FOR USE ON MASKING DEVICE

TECHNICAL FIELD

The present invention relates to portable masking devices for merging sheet masking material and pressure sensitive adhesive coated tape as they are pulled from the masking device to provide a composite masking sheet for use in masking surfaces such as during painting, which composite masking sheet comprises a length of the sheet material having the tape adhered along and extending widthwise past one edge by which the composite masking sheet can be adhered to a surface to be masked.

BACKGROUND ART

The prior art is replete with portable masking devices of the type described above that merge pressure sensitive adhesive coated tape with sheet masking material supplied from rolls of the tape and masking material carried on the masking devices. U.S. Pat. Nos. 3,787,271; 4,379,019; 4,425,182; 4,508,587, 4,667,891, 4,783,016; 4,915,768; and 4,990,214 describe illustrative examples.

Portable masking devices of this type typically each comprise tape and masking material hubs rotatably mounted on a frame, the tape hub including means for receiving a roll of pressure sensitive adhesive coated tape, and the masking material hub including means for receiving a roll of masking material. The masking devices each define a path for tape from the roll of tape to the periphery of the roll of masking material and thereafter a common path there the tape is adhered to the masking material to form a composite masking sheet having a portion of the coating of pressure sensitive adhesive exposed by which the composite masking sheet can be adhered along a surface to be masked. The masking devices each also include a manually engageable handle attached to the frame of the masking device by which the masking device is manipulated during use.

The portable masking device described in U.S. Pat. No. 4,990,214 is often used in places, such as on or near a ladder, where it is desirable to temporarily store the masking device when it is not being used. Heretofore, however, the structure of that masking device did not facilitate such temporary storage.

DISCLOSURE OF THE INVENTION

The present invention provides a simple and inexpensive hook that can be removably attached to a masking device of the type described above that allows the masking device to be securely hung on a structure such as the rung of a ladder on or near which it is being used.

The hook according to the present invention includes an attachment portion adapted to lay along and be releasably attached to the handle of the masking device with a first end of the attachment portion at the proximal end of that handle, and also includes a generally C-shaped engagement portion extending from the first end of the attachment portion and adapted to project above the proximal end of the handle, which engagement portion is adapted to be positioned around a structure to hang the masking device on the structure.

The handle can have a surface defining longitudinally extending grooves on opposite sides and a socket opening through the distal end of the handle, and the hook can be formed from a cylindrical rod bent to provide a central portion shaped to provide the generally c-shaped engagement portion, and opposite end portions providing the attachment portion, with each of the end portions shaped to extend along a different one of the grooves along the handle and having a U-shaped end part adapted to extend from that groove into the socket at the distal end of the handle. Means for releasably attaching the hook to the handle can then include a band (e.g., a resiliently elastic band) for securing the first end of the attachment portion to the proximal end of the handle.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
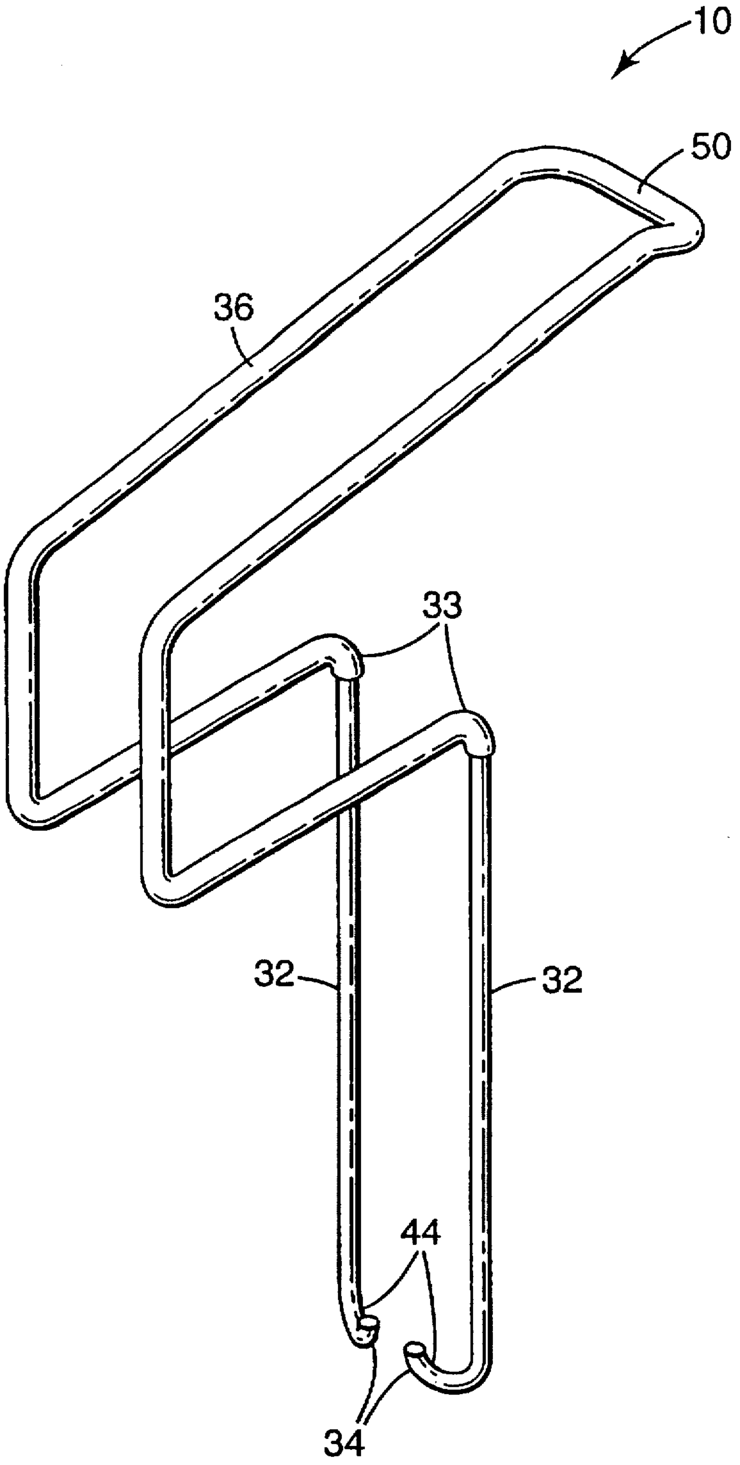
FIG. 1 is a perspective view of a hook included in a hook assembly according to the present invention.
Figure 2:
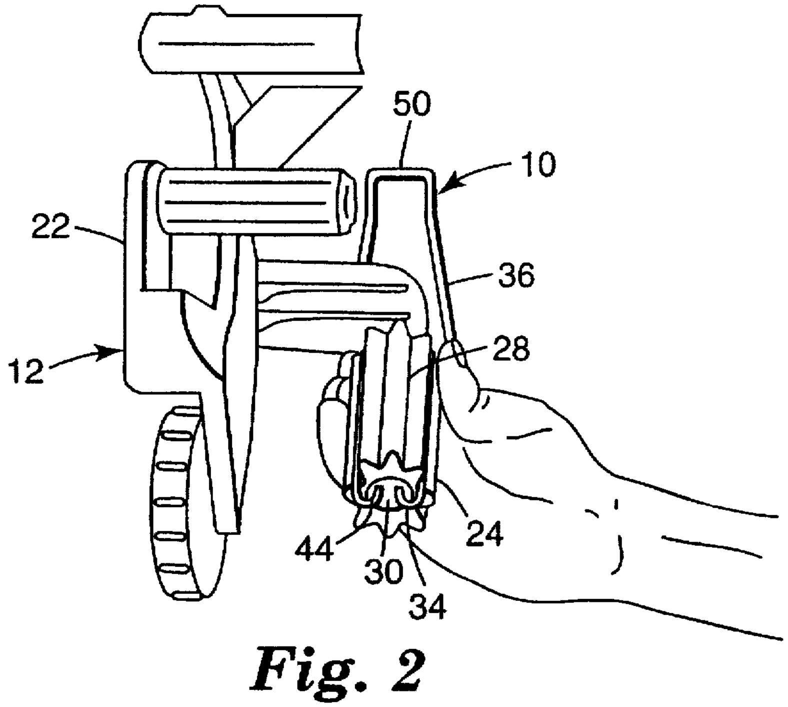
FIGS. 2 through 5 illustrate attaching the hook assembly according to the present invention to a portable masking device with which it is adapted to be engaged.
Figure 4:
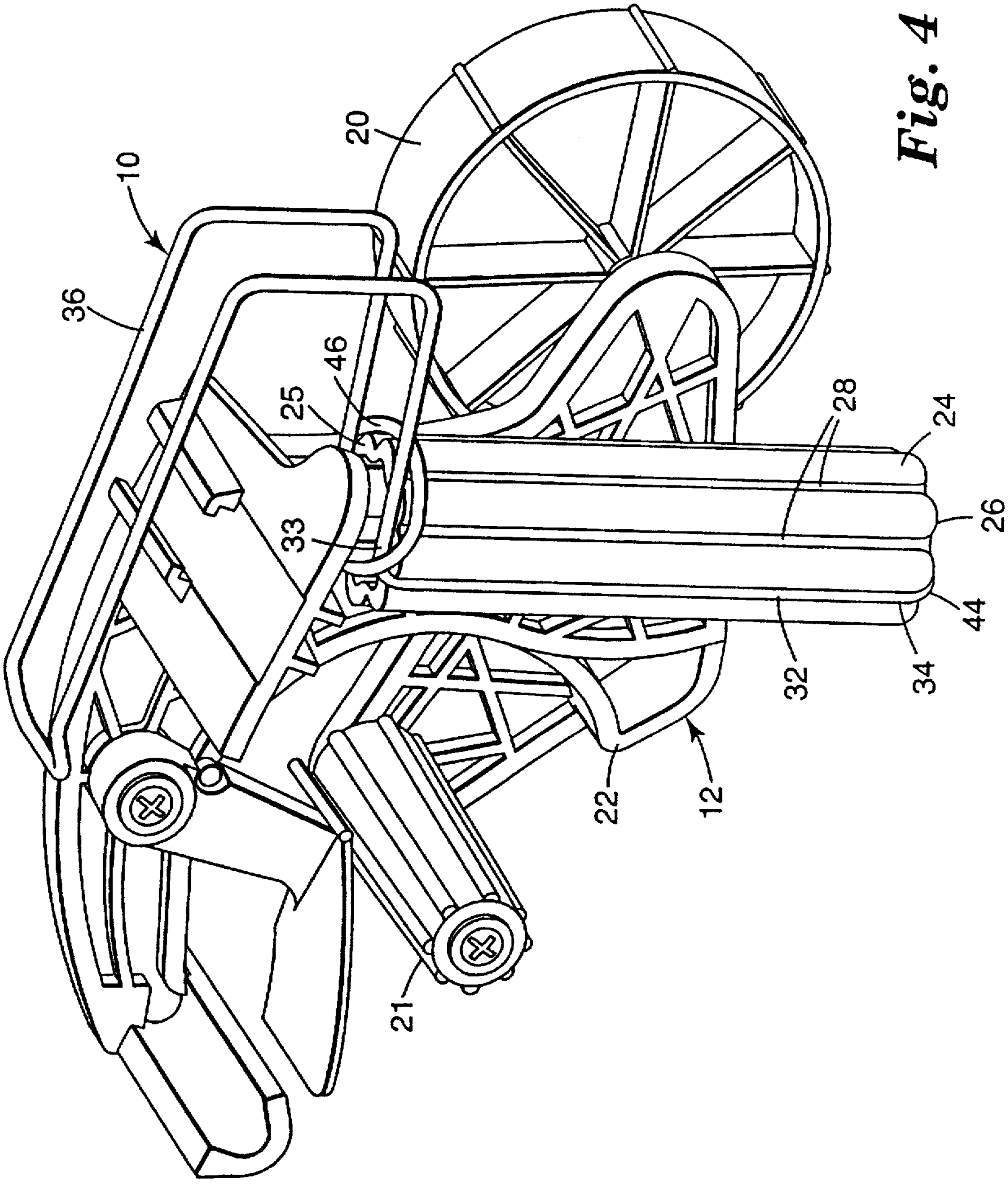
Figure 5:
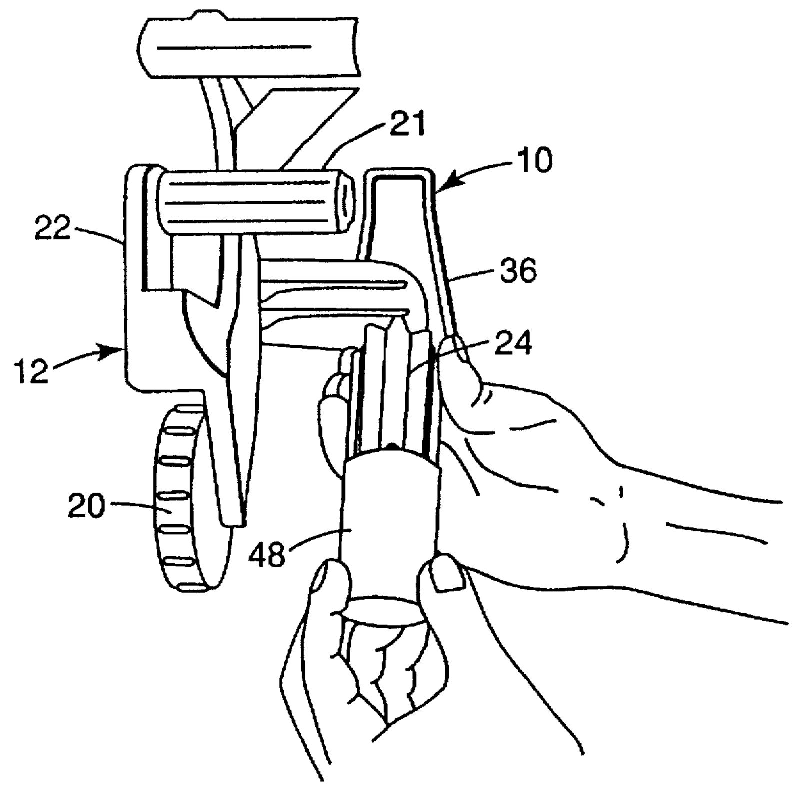
Figure 6:
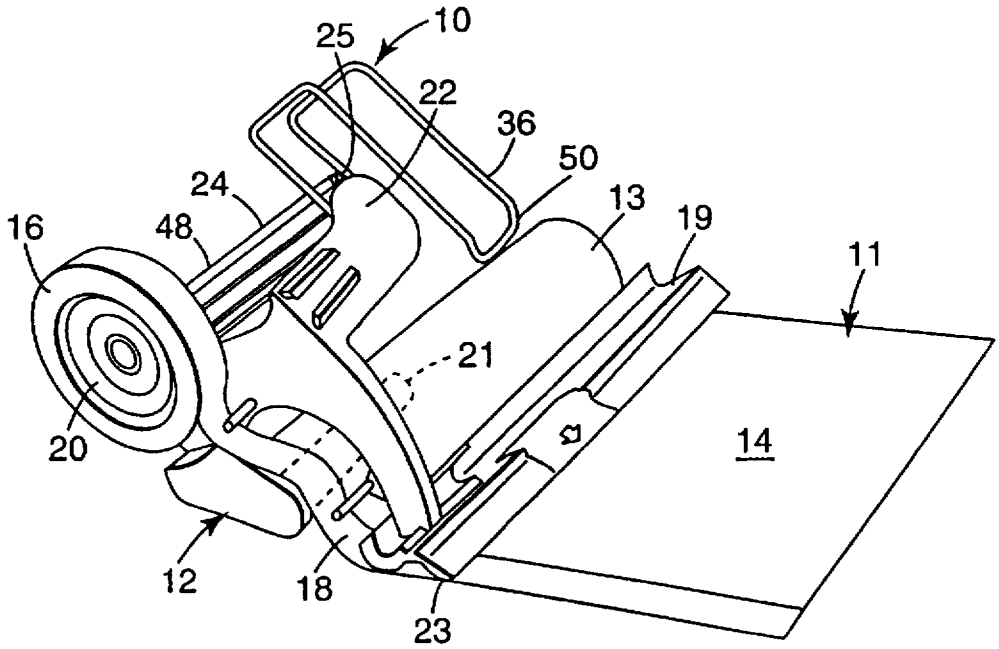
FIG. 6 is a perspective view of the portable masking device of FIGS. 2 through 5 to which the hook assembly has been attached being used to merge sheet masking material and pressure sensitive adhesive coated tape withdrawn from the portable masking device.

Referring now to the drawing, FIG. 1 illustrates a hook 10 included in a hook assembly according to the present invention; whereas FIGS. 2 through 5 illustrate attaching the hook assembly to a portable masking device 12 by which, as is illustrated in FIG. 6, composite masking material 11 may be formed from a roll 13 of masking material 14 (e.g., of either film or paper) and a roll 16 of adhesive coated tape 18 mounted on the masking device 12. The portable masking device 12 is essentially the same as the masking device described in U.S. Pat. No. 4,990,214 (the entire content whereof is incorporated herein by reference) except for the addition of the hook assembly according to the present invention that includes the hook 10.

Generally, with reference to FIG. 6, the portable masking device 12 comprises tape and masking material hubs 20 and 21 mounted on a frame 22 of the masking device 12 for rotation about spaced generally parallel axes. The tape hub 20 includes means for receiving the roll 16 of pressure sensitive adhesive coated tape 18, and the masking material hub 21 includes means for receiving the roll 13 of masking material 14. The masking device 12 defines a path for tape 18 from the roll 16 to the periphery of the roll 13 of masking material 14 and thereafter a common path where the tape 18 is adhered to the masking material 14 to form the composite masking material 11 with a portion of the pressure sensitive adhesive on the tape 18 exposed so that the exposed adhesive can adhere the composite masking material 11 along a surface to be masked. A cutting blade 19 having a serrated edge 23 is mounted on the frame 22 transverse of the common path for the tape 18 and masking material 14 to afford engagement of the serrated edge 23 of the blade 19 to sever the composite masking material 11. The masking device 12 also includes an elongate manually engageable handle 24 by which the masking device 12 can be manually manipulated as the composite masking material 11 is formed from the tape 18 and masking material 14 such as by pulling the composite masking material 11 from the masking device 12. The handle 24 extends transverse of and between the axes of the hubs 20 and 21 while being much closer to the axis of the tape hub 20 than to the axis of the roll 13 of masking material 14. A proximal end 25 of the handle 24 is attached to the frame 22, and the handle 24 has an opposite distal end 26. As can be seen in FIGS. 2 through 5, The handle 24 has a surface defining longitudinally extending (grooves 28 around its periphery, including grooves on opposite sides of the handle 24, and as can be see in FIGS. 2 and 3, the handle 24 also defines a socket 30 opening through its distal end 26.

Figure 7:
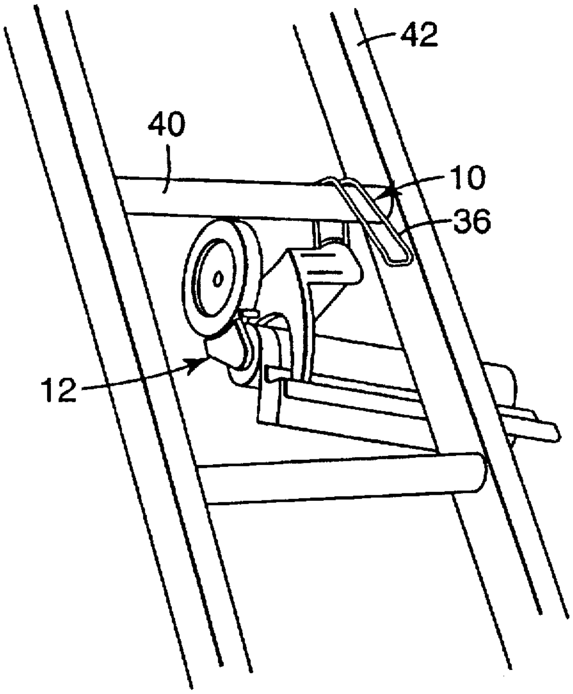
FIGS. 7 and 8 are perspective views of the masking device being hung from the rungs of two different types of ladders by the hook assembly according to the present invention.
Figure 8:
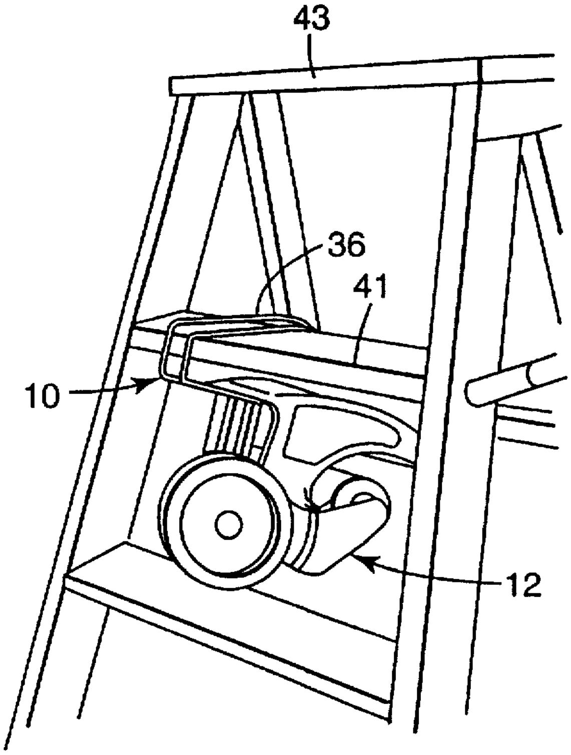

The hook 10 includes an attachment portion 32 having first and second ends 33 and 34. That attachment portion 32 of the hook 10 is adapted to lay along the handle 24 with its first end 33 at the proximal end 25 of the handle 24, and with a generally C-shaped engagement portion 36 of the hook 10 extending from the first end 33 of the attachment portion 32 and defining a recess adjacent the first end 33 of its engagement portion 36. The hook assembly includes means, later to be explained, for releasably attaching the attachment portion 32 of the hook 10 to the handle 24. After the attachment portion 32 of the hook 10 is attached to the handle 24 as is illustrated in FIGS. 2 through 5, the engagement portion 36 of the hook 10 can be positioned around a structure (e.g., the rung 40 or 41 of a ladder 42 or 43 as is illustrated for extension and step ladders 42 and 43 respectively in FIGS. 7 and 8), with the structure in the recess to hang the masking device 12 on the structure.

Figure 3:
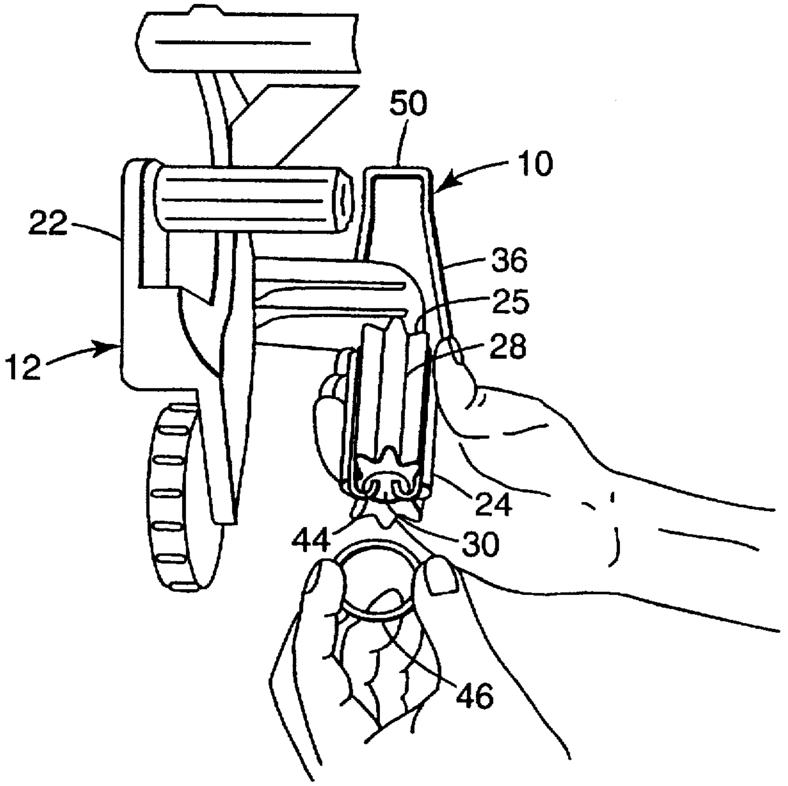

As illustrated, the hook 10 is formed of a cylindrical metal rod (e.g., 0.12 inch or 0.30 centimeter diameter steel) having a central portion that is coated with a polymeric material with higher surface friction than metal (e.g., poly vinyl chloride). That rod is bent and shaped to provide the attachment portion 32 and the generally c-shaped engagement portion 36 of the hook 10. The metal rod has two opposite end portions that together provide the attachment portion 32. Each of those end portions has a length and diameter adapted to extend along one of the grooves 28 on a different side of the handle 24, and those end portions have U-shaped end parts 44 defining the second end of the attachment portion 32 that are adapted to extend from those grooves 28 around the distal end 26 of the handle 24 and into the socket 30. The means for releasably attaching the attachment portion 32 of the hook 10 to the handle 24 include the engagement of the rod's end portions in the grooves 28, the engagement of the U-shaped end parts 44 around the distal end 26 of the handle 24, and the engagement of a band 46 around the first end 33 of the attachment portion 32 and the proximal end 25 of the handle 24. Preferably, as is illustrated in FIGS. 3 and 4, that band 46 is of resiliently elastic material (e.g., a rubber O ring) that is applied over the handle 24 and stretched around the first end 33 of the attachment portion and the proximal end 25 of the handle 24, however alternatively that band could be a cable tie or a piece of wire having its ends twisted together. A portion of the band 46 engages a notch between the proximal end 25 of the handle 24 and the frame 22 to retain its position at the proximal end 25. The band 46 holds a right angle intersection between the engagement and attachment portions 36 and 32 of the hook 10 at the proximal end 25 of the handle 24 to thereby maintain engagement of the U-shaped end parts 44 with the distal end 26 of the handle 24 and maintain firm engagement of the attachment portion 32 with the handle 24.

If desired, as is illustrated in FIG. 5, the hook assembly can also optionally include a hollow cylindrical sleeve 48 of polymeric foam (e.g., of neoprene or urethane foam) that can be pushed coaxially and longitudinally over the handle 24 and attachment portion 32 to then provide a compressible outer layer for the handle 24.

The C-shaped engagement portion 36 of the hook 10 defines a recess that (1) extends from the center or axis of the handle 24 toward the closed end of the recess for a distance (e.g., 2.34 inches) such that the closed end of the recess is on the side of the axis for the tape hub 20 opposite the handle 24, (2) opens in a direction toward which the composite masking material 11 is withdrawn from the masking device 12, and (3) has a minimum height in a direction parallel with the axis of the handle 24 of about 2 inches. The part of the engagement portion 36 opposite the handle 24 extends well past the center or axis of the handle 24 from the closed end of the recess (e.g., for about 4 and ¾ inches from the closed end of the recess) and has a slightly downwardly turned lip 50 at its distal end. With this shape, engagement of any part of the engagement portion 36 opposite the handle 24 on a support structure will require only slight pivoting of masking device 12 to position its center of gravity beneath that point of contact, and thereby provide secure support for the masking device 12.

The present invention has now been described with reference to one embodiment thereof It will be apparent to those skilled in the art that changes can be made in the embodiment described without departing from the scope of the present invention. Thus the scope of the present invention should not be limited to the structure described in this application, but only by structures described by the language of the claims and the equivalents of those structures.

What is claimed is:

1. In combination, a portable masking device comprising a frame and tape and masking material hubs mounted on the frame for rotation about spaced generally parallel axes, the tape hub including means for receiving a roll of pressure sensitive adhesive coated tape, and the masking material hub including means for receiving, a roll of masking material; the masking device defining a path for tape from the roll of tape to the periphery of the roll of masking material and thereafter a common path there the tape is adhered to the masking material to form a composite masking sheet with a portion of the coating of pressure sensitive adhesive exposed so that the exposed adhesive can adhere the composite masking sheet along a surface to be masked, said masking device including an elongate manually engageable handle extending transverse of said axes, having a proximal end attached to the frame, and having an opposite distal end; and a hook assembly comprising a hook including an attachment portion having first and second ends and laying along said handle with said first end at the proximal end of the handle, and a generally C-shaped engagement portion extending from the first end of said attachment portion and defining a recess adjacent the first end of said engagement portion, and the hook assembly including means releasably attaching said attachment portion of the hook to the handle so that the engagement portion can be positioned around a structure with the structure in the recess to hang the masking device on the structure.

2. A combination according to claim 1 wherein said handle has a surface defining longitudinally extending grooves on opposite sides of the handle and a socket opening through the distal end of the handle, said hook is formed of a rod having a central portion shaped to provide said generally c-shaped engagement portion, and end portions providing said attachment portion, with each of said end portions shaped to extend along a different one of said grooves, and having a U-shaped end part adapted to extend from the groove into said socket at the distal end of the handle, and said means for releasably attaching includes a band for securing the first end of the attachment portion to the proximal end of the handle.

3. A combination according to claim 2 wherein said band for securing the first end of the attachment portion to the proximal end of the handle is of resiliently elastic material stretched around the first end of the attachment portion and the proximal end of the handle.

* * * * *